US012588064B2

(12) United States Patent
Logothetis et al.

(10) Patent No.: US 12,588,064 B2
(45) Date of Patent: Mar. 24, 2026

(54) TECHNIQUES RELATING TO RANDOM ACCESS IN A WIRELESS COMMUNICATIONS NETWORK

(71) Applicant: AIRSPAN IP HOLDCO LLC, Boca Raton, FL (US)

(72) Inventors: Andrew Logothetis, High Wycombe (GB); Venkateswarlu Katepalli, Slough (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 681 days.

(21) Appl. No.: 17/945,496

(22) Filed: Sep. 15, 2022

(65) Prior Publication Data

US 2023/0095642 A1 Mar. 30, 2023

(30) Foreign Application Priority Data

Sep. 24, 2021 (GB) ..................................... 2113629

(51) Int. Cl.
*H04W 74/0833* (2024.01)
*H04W 74/0838* (2024.01)

(52) U.S. Cl.
CPC .... *H04W 74/0833* (2013.01); *H04W 74/0838* (2024.01)

(58) Field of Classification Search
CPC ...................... H04W 74/0833; H04W 74/0838
See application file for complete search history.

(56) References Cited

U.S. PATENT DOCUMENTS

2013/0324077 A1* 12/2013 Decarreau ............. H04W 48/06
455/405
2016/0007360 A1* 1/2016 Nguyen ............ H04W 72/0446
370/280

(Continued)

FOREIGN PATENT DOCUMENTS

CN 102571551 A * 7/2012
EP 3657878 A1 5/2020

(Continued)

OTHER PUBLICATIONS

3GPP TS 136.331 version 16.1.1 Release 16 (Year: 2020).*
GB Search Report in GB2113629.6 dated Jun. 30, 2022, 3 pages.

*Primary Examiner* — Rebecca E Song
*Assistant Examiner* — Shu Liu
(74) *Attorney, Agent, or Firm* — Haynes Beffel & Wolfeld LLP; Andrew L. Dunlap; Jason Liao

(57) ABSTRACT

In a wireless communications system comprising a user device and a base station, the base station periodically broadcasts system information which is used by the user device in a random access procedure to connect to the base station. The base station grants uplink resource to the user device for sending a connection request message. In response to the connection request message, the base station transmits a contention resolution message, which the user device must acknowledge. The system information periodically broadcast by the base station comprises an acknowledgement control marker defining whether the acknowledgement is to be sent on a reserved uplink control channel using second uplink resource or via first uplink resource allocated to the user device in the uplink grant for the connection request message.

17 Claims, 6 Drawing Sheets

(56)                References Cited

U.S. PATENT DOCUMENTS

Figure 1:
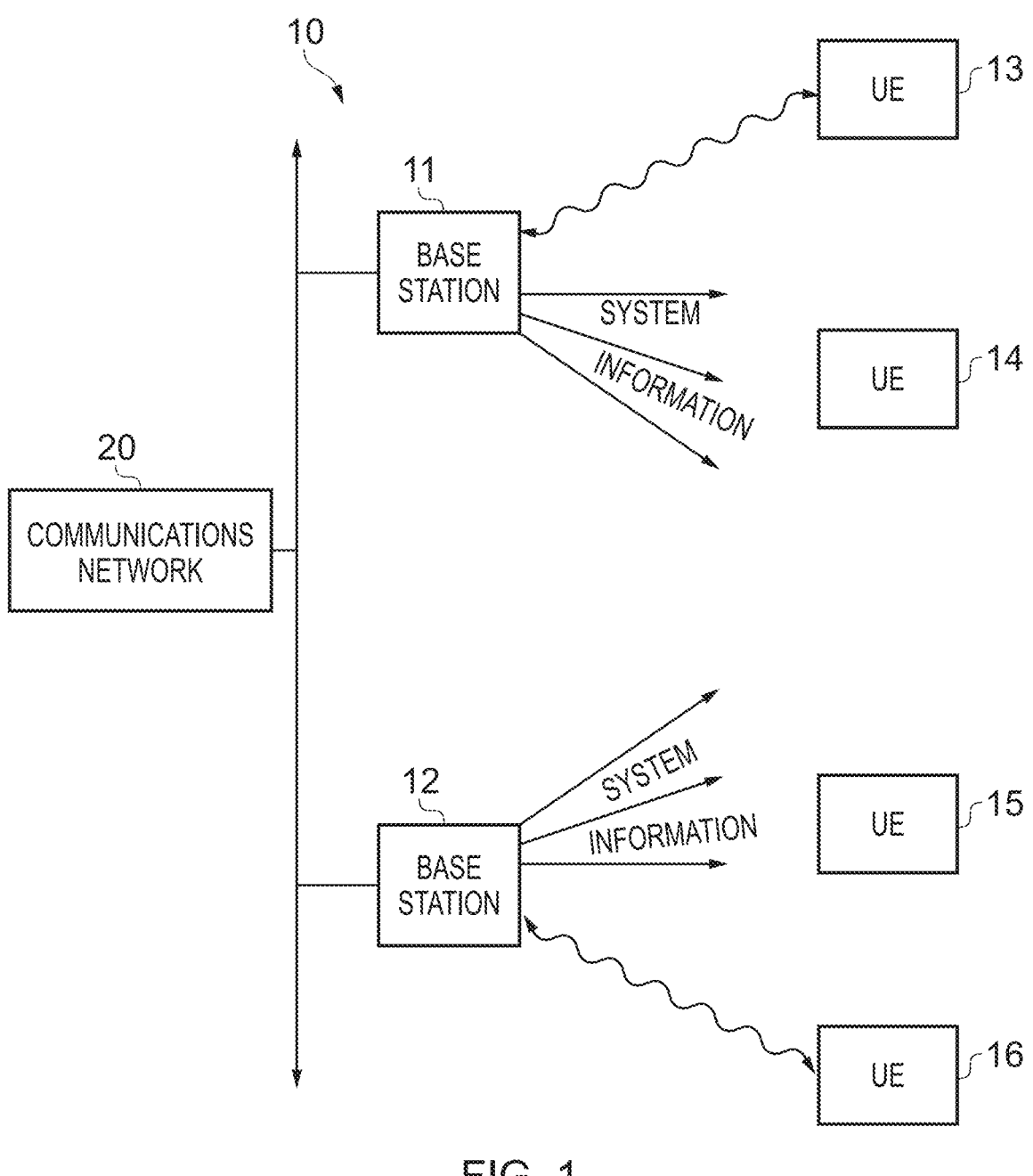

| 2019/0036654 | A1* | 1/2019 | Kim | ...................... | H04L 1/1812 |
|---|---|---|---|---|---|
| 2019/0349760 | A1* | 11/2019 | Fong | ................... | H04L 27/0006 |
| 2020/0314815 | A1* | 10/2020 | Kim | ...................... | H04L 1/1854 |
| 2021/0266970 | A1* | 8/2021 | Lei | ...................... | H04W 74/006 |
| 2023/0199622 | A1* | 6/2023 | Liu | ...................... | H04W 48/06 |
| | | | | | 455/422.1 |

FOREIGN PATENT DOCUMENTS

| WO | 2012110566 A1 | 8/2012 |
|---|---|---|
| WO | 2020247797 A1 | 12/2020 |

\* cited by examiner

UE　　　　　　　　　　　　　　　　　　gNB

Random Access Preamble (MSG1)

PDCCH - DCI Format 1_0 (RA-RNTI)

PDSCH - Random Access Response (MSG2)

PUSCH - Scheduled Transmission (MSG3)

PDCCH - DCI Format 0_0 (TC-RNTI)

PUSCH - Scheduled Re-Transmission (MSG3)

PDCCH - DCI Format 1_0 (TC-RNTI)

PDSCH - Contention Resolution MAC CE (MSG4)

ACK for MSG4 either:

1) PUCCH - HARQ ACK; or
2) On UL grant for MSG3

TECHNIQUES RELATING TO RANDOM ACCESS IN A WIRELESS COMMUNICATIONS NETWORK

The present techniques relate to wireless communications.

A wireless communications network may comprise base stations and user equipment (UE), wherein the base stations are deployed at fixed physical locations, whilst the UE are mobile. In this context a UE will typically establish a connection to one of the base stations of the wireless communications network, with the particular base station being selected depending on a number of factors, such as distance, signal strength, and available bandwidth. This 'random' access of a UE to a base station requires an initial set of communications to be exchanged between the UE and the base station, in order for the base station to provide certain configuration parameters to the UE, in order for the UE to declare its desire to connect to the base station, and so on. Generally, the base station may periodically broadcast some initial configuration parameters, which a UE in the vicinity may use to configure itself for connection to the base station. Nevertheless, for the connection to be established, it is necessary for the UE also to be able to communicate to the base station during the setup phase, for example to acknowledge downlink messages sent to it as part of the connection protocol by the base station. Accordingly, an uplink channel is commonly reserved having statically allocated radio resources, in order to allow the UE (before it is connected to the base station) to send such messages to the base station. However, the static configuration of radio resource for such purposes means that this capacity cannot be used for data transfer in established communications, reducing the potential uplink throughput data rate in the system.

At least some examples disclosed herein provide a wireless communications system comprising a user device and a base station, wherein the base station is configured to periodically broadcast system information on a physical broadcast channel, wherein the user device is configured, when in an unconnected state with respect to the base station, to participate in a random access procedure to seek to establish a connected state with respect to the base station, wherein the random access procedure comprises:

the user device transmitting a random access preamble in accordance with parameters specified in the system information;

in response to the random access preamble, the base station transmitting a random access response, wherein the random access response indicates an uplink grant allocated to the user device, the uplink grant comprising first uplink resource allocated to the user device for a connection request message;

in response to the random access response, the user device transmitting the connection request message via the first uplink resource;

in response to the connection request message, the base station transmitting a contention resolution message;

and in response to the contention resolution message, the user device transmitting an acknowledgement signal, wherein the system information periodically broadcast by the base station on the physical broadcast channel comprises an acknowledgement control marker, wherein the user device is configured:

when the acknowledgement control marker is not set, to transmit the acknowledgement signal on a reserved uplink control channel using second uplink resource, and when the acknowledgement control marker is set, to transmit the acknowledgement signal via the first uplink resource allocated to the user device in the uplink grant for the connection request message.

At least some examples disclosed herein provide a method of operating a wireless communications system comprising a user device and a base station comprising:

the base station periodically broadcasting system information on a physical broadcast channel;

the user device, when in an unconnected state with respect to the base station, participating in a random access procedure to seek to establish a connected state with respect to the base station, wherein the random access procedure comprises:

the user device transmitting a random access preamble in accordance with parameters specified in the system information;

in response to the random access preamble, the base station transmitting a random access response, wherein the random access response indicates an uplink grant allocated to the user device, the uplink grant comprising first uplink resource allocated to the user device for a connection request message;

in response to the random access response, the user device transmitting the connection request message via the first uplink resource;

in response to the connection request message, the base station transmitting a contention resolution message;

and in response to the contention resolution message, the user device transmitting an acknowledgement signal, wherein the system information periodically broadcast by the base station on the physical broadcast channel comprises an acknowledgement control marker, wherein the user device:

when the acknowledgement control marker is not set, transmit the acknowledgement signal on a reserved uplink control channel using second uplink resource, and when the acknowledgement control marker is set, to transmit the acknowledgement signal via the first uplink resource allocated to the user device in the uplink grant for the connection request message.

At least some examples disclosed herein provide a base station for communicating with a user device in a wireless communications system, wherein the base station is configured to periodically broadcast system information on a physical broadcast channel, and wherein the base station is configured, when in an unconnected state with respect to the user device, to participate in a random access procedure to seek to establish a connected state with respect to the user device, wherein in the random access procedure, the base station is configured to:

listen for and receive a random access preamble transmitted by the user device in accordance with parameters specified in the system information;

transmit a random access response in response to the random access preamble, wherein the random access response indicates an uplink grant allocated to the user device, the uplink grant comprising first uplink resource allocated to the user device for a connection request message;

listen for and receive the connection request message transmitted by the user device via the first uplink resource;

transmit a contention resolution message in response to the connection request message;

and listen for and receive an acknowledgement signal transmitted by the user device in response to the contention resolution message, wherein the system information periodically broadcast by the base station on the physical broadcast channel comprises an acknowledgement control marker, wherein the base station is configured:

when the acknowledgement control marker is not set, to listen for and receive the acknowledgement signal on a reserved uplink control channel using second uplink resource, and when the acknowledgement control marker is set, to listen for and receive the acknowledgement signal via the first uplink resource allocated to the user device in the uplink grant for the connection request message.

At least some examples disclosed herein provide a method of operating a base station configured to communicate with a user device in a wireless communications system comprising:

periodically broadcasting system information on a physical broadcast channel; and when in an unconnected state with respect to the user device, participating in a random access procedure to seek to establish a connected state with respect to the user device, wherein the random access procedure comprises:

listening for and receiving a random access preamble transmitted by the user device in accordance with parameters specified in the system information;

transmitting a random access response in response to the random access preamble, wherein the random access response indicates an uplink grant allocated to the user device, the uplink grant comprising first uplink resource allocated to the user device for a connection request message;

listening for and receiving the connection request message transmitted by the user device via the first uplink resource;

transmitting a contention resolution message in response to the connection request message;

and listening for and receiving an acknowledgement signal transmitted by the user device in response to the contention resolution message, wherein the system information periodically broadcast by the base station on the physical broadcast channel comprises an acknowledgement control marker, and wherein the base station:

when the acknowledgement control marker is not set, listens for and receives the acknowledgement signal on a reserved uplink control channel using second uplink resource, and when the acknowledgement control marker is set, listens for and receives the acknowledgement signal via the first uplink resource allocated to the user device in the uplink grant for the connection request message.

At least some examples disclosed herein provide a user device for communicating with a base station in a wireless communications system, wherein the user device is configured, when in an unconnected state with respect to the base station, to participate in a random access procedure to seek to establish a connected state with respect to the base station, wherein the user device is configured to listen for and receive system information periodically broadcast on a physical broadcast channel by the base station, and in the random access procedure, the user device is configured to:

transmit a random access preamble in accordance with parameters specified in the system information;

listen for and receive a random access response transmitted by the base station in response to the random access preamble, wherein the random access response indicates an uplink grant allocated to the user device, the uplink grant comprising first uplink resource allocated to the user device for a connection request message;

transmit the connection request message via the first uplink resource;

listen for and receive a contention resolution message transmitted by the base station in response to the connection request message;

and transmit an acknowledgement signal in response to the contention resolution message, wherein the system information periodically broadcast by the base station on the physical broadcast channel comprises an acknowledgement control marker, wherein the user device is configured:

when the acknowledgement control marker is not set, to transmit the acknowledgement signal on a reserved uplink control channel using second uplink resource, and when the acknowledgement control marker is set, to transmit the acknowledgement signal via the first uplink resource allocated to the user device in the uplink grant for the connection request message.

At least some examples disclosed herein provide a method of operating a user device configured to communicate with a base station in a wireless communications system comprising:

listening for and receiving system information periodically broadcast on a physical broadcast channel by the base station; and when in an unconnected state with respect to the base station, participating in a random access procedure to seek to establish a connected state with respect to the base station, wherein the random access procedure comprises:

transmitting a random access preamble in accordance with parameters specified in the system information;

listening for and receiving a random access response transmitted by the base station in response to the random access preamble, wherein the random access response indicates an uplink grant allocated to the user device, the uplink grant comprising first uplink resource allocated to the user device for a connection request message;

transmitting the connection request message via the first uplink resource;

listening for and receiving a contention resolution message transmitted by the base station in response to the connection request message;

and transmitting an acknowledgement signal in response to the contention resolution message, wherein the system information periodically broadcast by the base station on the physical broadcast channel comprises an acknowledgement control marker, and wherein the user device:

when the acknowledgement control marker is not set, transmits the acknowledgement signal on a reserved uplink control channel using second uplink resource, and when the acknowledgement control marker is set, transmits the acknowledgement signal via the first uplink resource allocated to the user device in the uplink grant for the connection request message.

Figure 2:
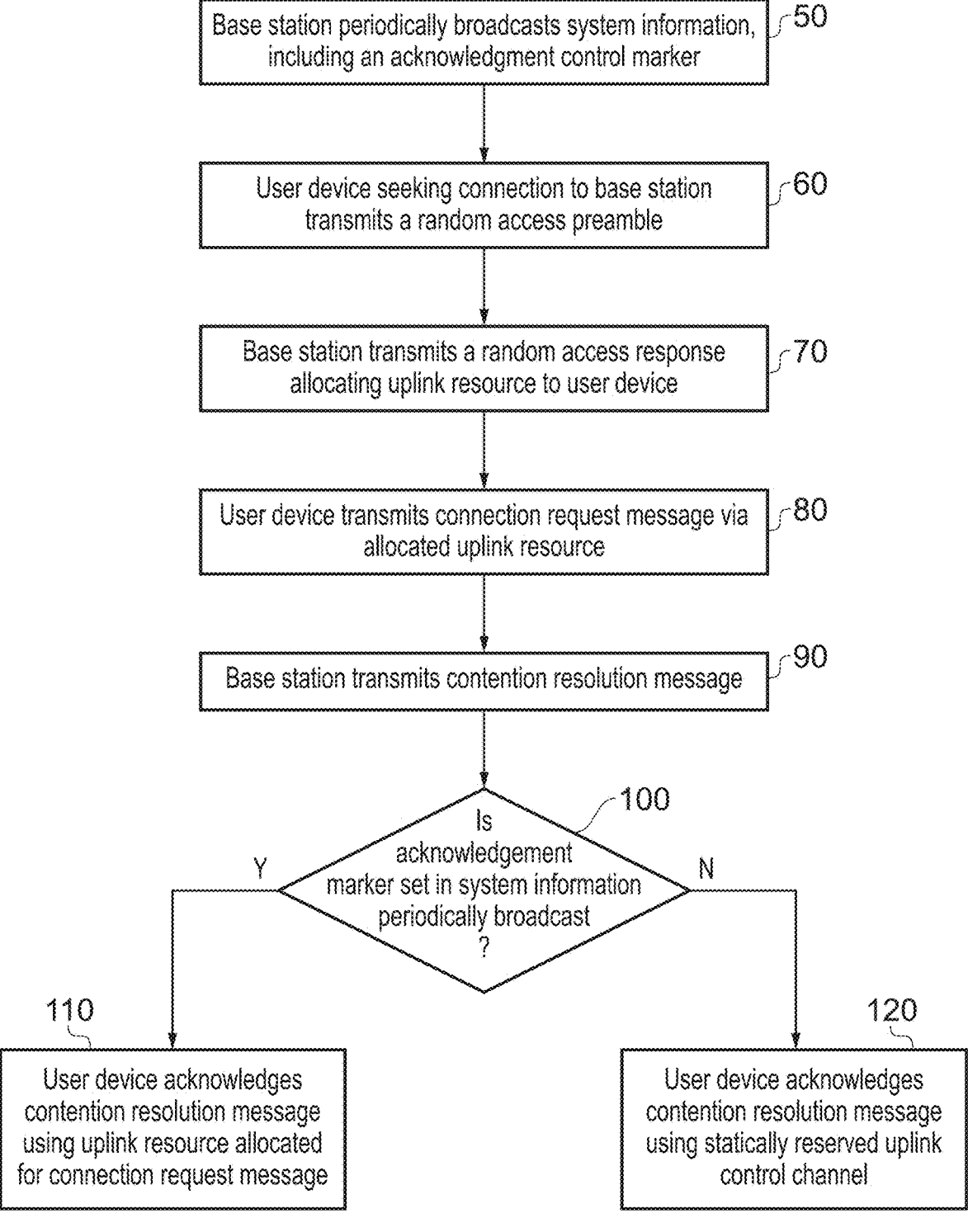
Figure 3:
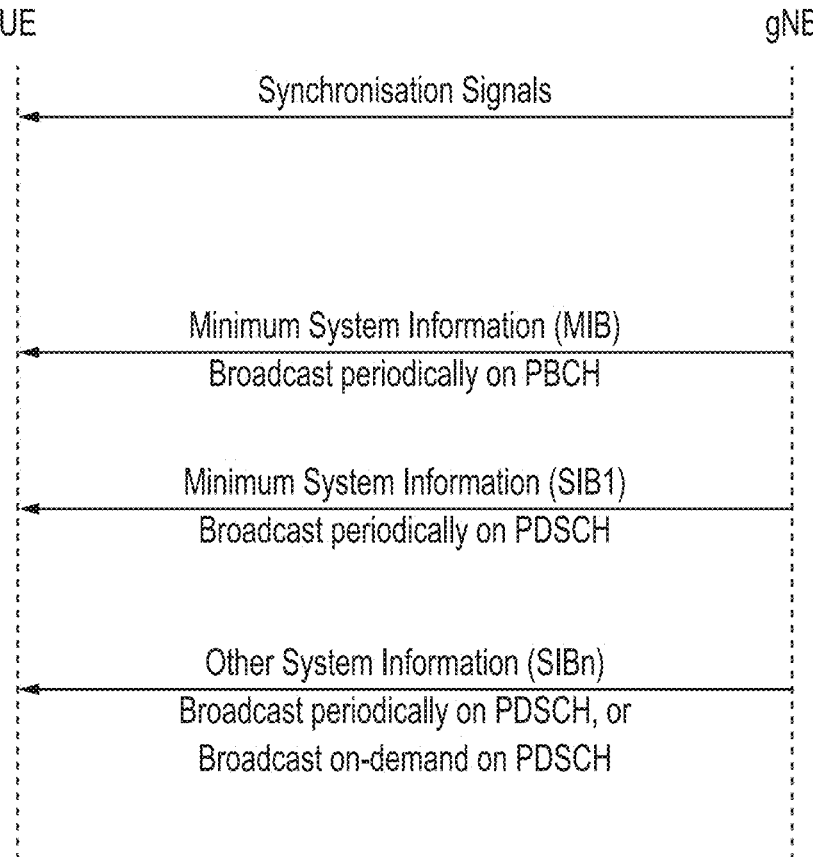
Figure 4:
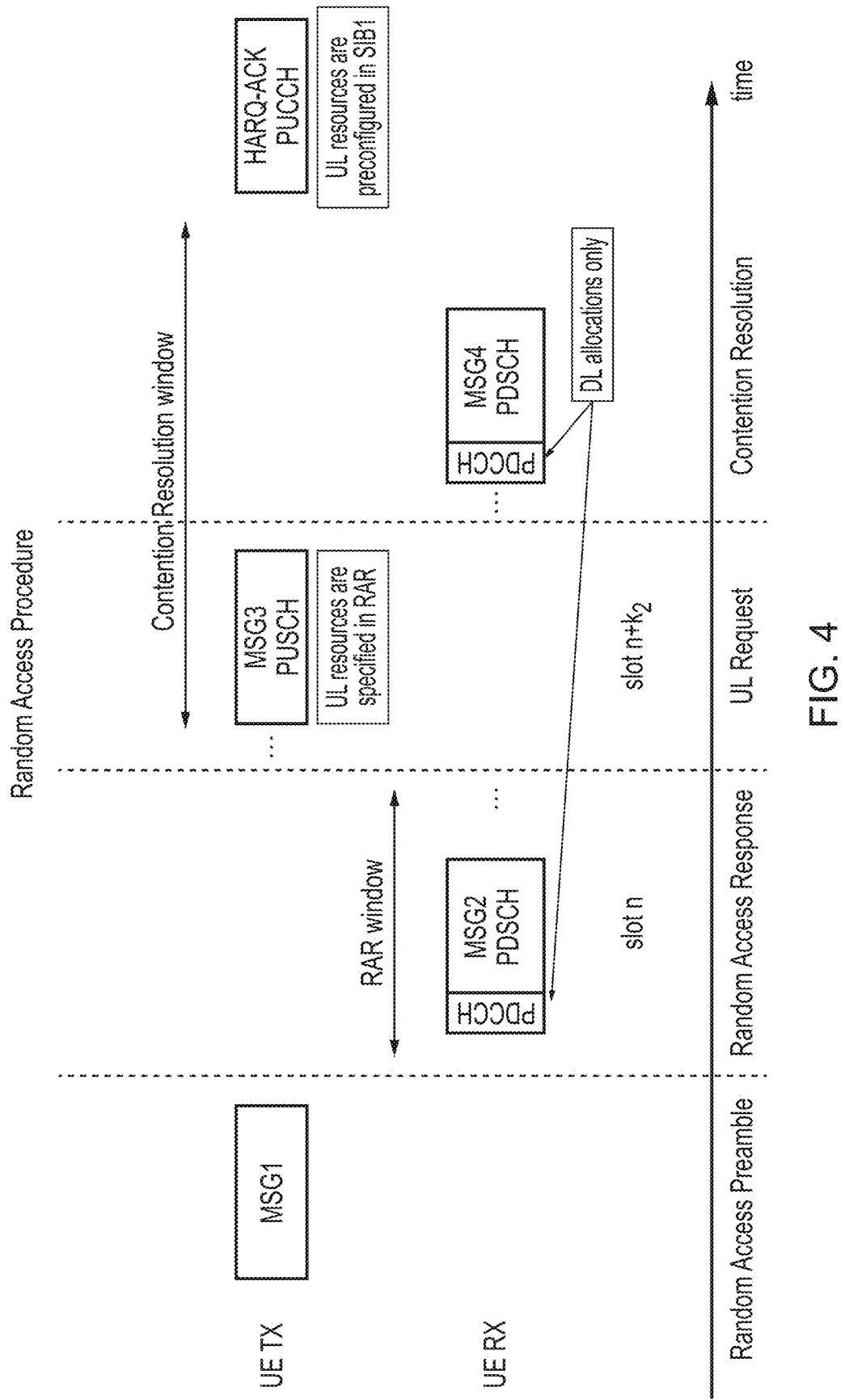
Figure 5:
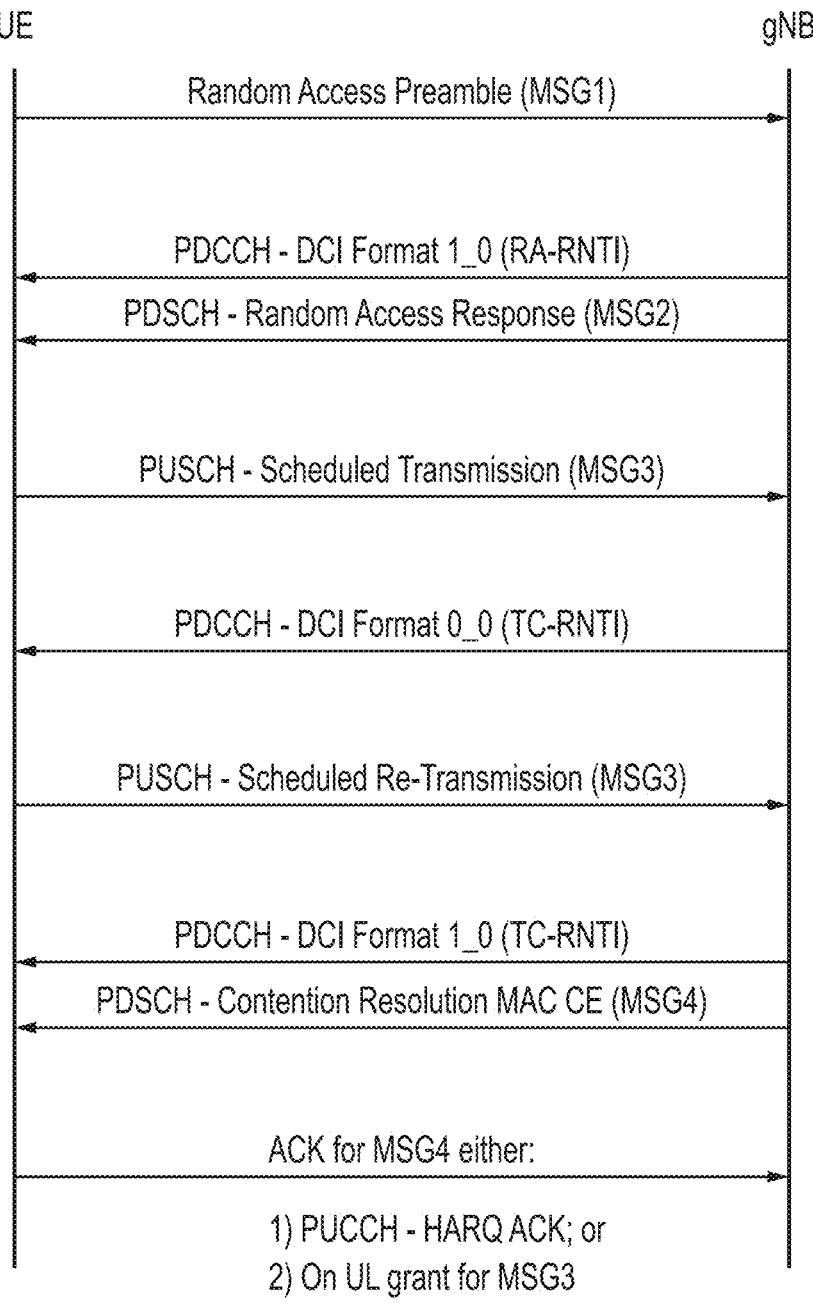

The present techniques will be described further, by way of example only, with reference to embodiments thereof as illustrated in the accompanying drawings, to be read in conjunction with the following description, in which:

FIG. 1 schematically illustrates a wireless communications system comprising user devices and base stations in accordance with some disclosed examples;

FIG. 2 shows a sequence of steps which are taken when operating a wireless communications system comprising a user device and a base station in accordance with some disclosed examples;

FIG. 3 schematically illustrates the broadcasting of synchronisation signals comprising system information by a base station in accordance with some disclosed examples;

FIG. 4 schematically illustrates a random access procedure followed by a user device in a wireless communication system from the perspective of the user device in accordance with some disclosed examples;

FIG. 5 schematically illustrates some exchanges messages in a random access procedure in a wireless communications system comprising a user device and the base station in accordance with some disclosed examples; and FIGS. 6A, 6B, 6C and 6D schematically illustrate various examples of system information broadcast on a physical broadcast channel by a base station and one or more bits in that system information which is used as an acknowledgement control marker in accordance with some disclosed examples.

The present techniques are based on the realisation that the usual configuration of providing a reserved uplink control channel to be used by user equipment to convey such an acknowledgement signal to the base station may in some regards be inefficient. In particular, where such a reserved uplink control channel is provided by statically configured, persistent radio resources, this means that some of the scarce radio resources of the wireless communications system are permanently unavailable for data transfer, e.g. uplink data transmission from the user equipment to the base station. In this context it has further been realised that it is not necessary during the contention resolution phase of a random access procedure for a user equipment to connect to a base station for an acknowledgement signal transmitted by the user equipment to the base station in response to a contention resolution message to make use of the reserved uplink control channel. Instead the user equipment may transmit the acknowledgement signal making use of uplink resource allocated ("granted") to the user device earlier in the random access procedure, namely the uplink grant allocated by the base device in response to a random access preamble to allow to the user device to transmit a connection request message. Valuable uplink resource can therefore be freed up, thus increasing the uplink data throughput rate in the system as a whole. Nevertheless, the present techniques are proposed in the further recognition that some communication protocols dictate the presence of the reserved uplink control channel, and therefore it is further proposed herein that the base station can define whether the above discussed uplink grant re-use technique is to employed or not, by means of an acknowledgement control marker which forms part of the system information periodically broadcast by the base station on the physical broadcast channel. The user device can then identify from this acknowledgement control marker amongst the parameters specified in the system information the transmission channel by which it should send its acknowledgement signal in response to the contention resolution message.

Accordingly, the present techniques enable the base station to control, by the use of this acknowledgement control marker, how this aspect of the random access procedure between the user equipment and the base station will be carried out. Hence according to some disclosed examples, the base station is configured to statically reserve the second uplink resource for the reserved uplink control channel when broadcasting the system information comprising the acknowledgement control marker which is not set. Alternatively, in other disclosed examples, the base station is configured not to statically reserve the second uplink resource for the reserved uplink control channel when broadcasting the system information comprising the acknowledgement control marker which is set.

When the acknowledgement control marker is not set, the base station can be arranged to allocate the second uplink resource in various ways, but in some disclosed examples the base station is configured to allocate the second uplink resource for user device upload on a demand basis.

In some disclosed examples the system information broadcast on the physical broadcast channel comprises a master information block and at least one system information block.

The acknowledgement control marker may be provided in the broadcast system information in a variety of ways.

In some disclosed examples the user device and the base station are configured to communicate in accordance with a standardized protocol, wherein the standardized protocol defines the master information block to comprise a predetermined set of bits, wherein the predetermined set of bits comprises a protocol-compliance set of bits and a protocol-unused set of bits, wherein at least one of the protocol-unused set of bits is used for the acknowledgement control marker.

In some disclosed examples the at least one of the protocol-unused set of bits used for the acknowledgement control marker is at least one spare bit forming part of the master information block.

In some disclosed examples the standardized protocol defines the system information to be broadcast on the physical broadcast channel in a predetermined payload size comprising the predetermined set of bits of the master information and a further portion, wherein at least one of the protocol-unused set of bits used for the acknowledgement control marker is at least one bit of the further portion.

In some disclosed examples the at least one of the protocol-unused set of bits used for the acknowledgement control marker is at least one reserved bit forming part of a physical broadcast channel payload.

In some disclosed examples the user device and the base station are configured to communicate in accordance with a standardized protocol, wherein the standardized protocol defines the at least one system information block to comprise at least one protocol-unused set of bits, wherein the at least one protocol-unused set of bits is used for the acknowledgement control marker.

In some disclosed examples the at least one protocol-unused set of bits used for the acknowledgement control marker comprises a set of bits reserved for proprietary vendor-specific communication messages between the user device and the base station.

In some disclosed examples the at least one protocol-unused set of bits used for the acknowledgement control marker comprises a lateNonCriticalExtension octet string of an LTE protocol.

Some particular embodiments are now described with reference to the figures.

FIG. 1 schematically illustrates a wireless communications system 10 comprising base stations 11, 12 and user devices 13, 14, 15, 16 in accordance with some disclosed examples. The base stations and user devices (user equipment) are arranged to communicate in accordance with a defined wireless communications protocol, which allows the user equipment access to a wider communications network 20 to which each of the base stations 11, 12 are connected. In the example illustration of FIG. 1, the user equipment (UE) 13 is in established communication with the base station 11 and the UE 16 is an established communication with the base station 12. That is to say, that each of UE 13 and UE 16 are in a connected state with the respective base stations 11 and 12. The particular wireless communications protocol by which the base stations and user devices communicate may take a variety of forms, such as the range of protocols defined by the 3rd Generation Partnership Project (3GPP), i.e. various 3G standards, LTE and various 4G standards, various 5G standards etc. Further, in the example illustration of FIG. 1, the UE 14 and the UE 15 are not in a connected state with either of the base stations. In order to enable UEs in the vicinity to begin a random access procedure by means of which they can establish a connected state with a base station, each of the base stations periodically broadcasts synchronisation and system information. The broadcasting of this information is shown in FIG. 1. A user device in the vicinity of a base station can make use of this synchronisation and system information to begin a random access procedure to seek to connect to that base station, as will be described in more detail with reference to the further figures.

FIG. 2 shows a sequence of steps which are taken when operating a wireless communications system comprising a user device and a base station in accordance with some disclosed examples. The procedure begins at step 50, where a base station periodically broadcasts system information, wherein that system information includes an acknowledgement control marker. Next, at step 60, a user device seeking connection to this base station, and which receives the system information broadcast by the base station, transmits a random access preamble. Next at step 70 the base station to which this random access preamble has been directed (by virtue of the random access preamble having been made in accordance with the system information broadcast by that base station) responds, transmitting a random access response which allocates uplink resource to the user device. Then the user device, at step 80, transmits a connection request message via the allocated uplink resource. In receipt of this connection request message, the base station at step 90 transmits a contention resolution message. In order for the random access procedure to complete, the user device needs to acknowledge receipt of this contention. At step 100 the user device determines whether the acknowledgement marker is set in the system information periodically broadcast by the base station. It will be appreciated that the time point at which this "determination" occurs may in fact be at another point in the procedural flow (for example, shortly after the system information is received by the user device) and the determination of step 100 is only presented at this point for ease of comprehension of the disclosed procedure. When the acknowledgement marker is set, the flow proceeds to step 110, where the user device acknowledges the contention resolution message using the uplink resource which was allocated to it by the base station for sending its connection request message. Conversely, when the acknowledgement marker is not set, the flow proceeds to step 120, where the user device acknowledges the contention resolution message using a statically reserve uplink control channel. FIG. 2 therefore presents a high-level overview of the manner in which the random access procedure disclosed herein functions. More detail of some specific ways in which the random access procedure can be carried out are given with reference to the following figures.

Although applicable to various other wireless communication protocols as mentioned above, the examples which follow are generally presented in the context of the 5G New Radio (NR) standard which stipulates that the uplink (UL) transmissions from the user equipment (UE) to the base station (gNB) employ at least two channels. These are the Physical Uplink Shared Channel (PUSCH) and the Physical Uplink Control Channel (PUCCH). The former is shared amongst the UE and it is the responsibility of a scheduler in the gNB to apportion air interface resources, i.e. Resources Blocks (RBs), such that no two users are allocated the same RBs, unless the UE signals are beamformed and thus largely spatially separable. The PUCCH is used by the UEs to signal Uplink Control Information (UCI) to the gNB, where the UCI comprises at least one of the following: 1) a reception acknowledgment (HARQ-ACK); 2) a Scheduling Request (SR); and 3) Channel State Information (CSI). During normal operation mode, for example when the UE is in the RRC CONNECTED state, the UCI may be multiplexed ("piggy-backed") on the PUSCH data transmissions. However, when the UE is performing a contention-based Random Access (RA) procedure, the UE has not been allocated dedicated radio resources, so—according to the NR standard—the UE must rely on the PUCCH to send acknowledgment of DL messages during the sign on process. However, as mentioned above and as described in more detail below, the present disclosure proposes an approach which means that the UE does not need to rely on the PUCCH to send acknowledgment of downlink (DL) messages during the sign on process. According to the NR standard, the PUCCH is statically configured, with persistent radio resources allocated to this purpose being signalled to the UE periodically using System Information Blocks (SIBs). RBs allocated to the PUCCH cannot be used by the PUSCH. Accordingly, where the proposal of the present disclosure provides an alternative mechanism for the RA procedure, without the need of the PUCCH, this frees up valuable resources which can thus be used by the PUSCH, increasing the UL throughput data rate in the system as a whole.

FIG. 3 schematically illustrates the broadcasting of synchronisation signals comprising system information by a base station in accordance with some disclosed examples. The first step in the Random access procedure, when a UE seeks to connect to a gNB, is for the UE to synchronise itself to the gNB and to extract the System Information broadcast by the gNB, as shown in FIG. 3. Note that only a relatively brief overview of the Random access procedure is given here for the purpose of understanding the present invention. Further detail of the random access procedure may be obtained from section 8 of the technical specification published by ETSI (reference RTS/TSGR-0138213vf90) entitled "5G; NR; Physical layer procedures for control (3GPP TS 38.213 version 15.9.0 Release 15)" and available from the website: http://www.etsi.org/standards-search. The system information comprises the Master Information Block (MIB) and one or more System Information Blocks (SIBs). SIBs are divided into the minimum system information and other system information blocks. The MIB is broadcast periodically by the gNB (base station) on the Physical Broadcast Channel (PBCH). It contains key physical layer parameters, for example the subcarrier spacing of the air interface. In addition, the MIB points to the CORESET #0 that indicates the location where the Downlink Control Information (DCI) resides. The DCI further points to a location within the Physical Downlink Shared Channel (PDSCH) where the SIB1 is to be found. The SIB1 is periodically transmitted and contains essential information for the UE to proceed with initial access. SIB1 is also referred to as remaining minimum system information (RMSI). Other system information blocks SIB2, SIB3, etc. are broadcast periodically or on demand on the PDSCH. They contain information to assist for example with hand over to other systems or cells. Once synchronisation has been achieved and the system information has been extracted (and note that this system information includes the acknowledgement control marker proposed herein), the UE proceeds with the initial access that comprises the four steps as shown in FIG. 4.

FIG. 4 schematically illustrates four stages of a random access procedure followed by a user device in a wireless communication system from the perspective of the user device in accordance with some disclosed examples. The four stages (as labelled in FIG. 4) are the random access preamble stage, the random access response stage, the uplink request stage, and the contention resolution stage. Further detail of these four stages are schematically illustrated in FIG. 5 and are given below:

1. Random Access Preamble (RAP-MSG1)

UE selects a PRACH occasion and transmits PRACH preamble (FIG. 5 MSG1)

UE derives the RA-RNTI (function of PRACH occasion parameters i.e. symbol, slot, frequency)

UE starts the Random Access Response window (use new preamble if expired)

If PRACH detected, gNB computes the RA-RNTI associated with the PRACH occasion. The RAPID value is also computed (preamble index)

See also MSG1 in FIG. 5)

2. Random Access Response (RAR-MSG2)

UE monitors the PDCCH, awaiting a DCI using Format 1_0 and the CRC bits are scrambled by the anticipated RA-RNTI If DCI is decoded, the UE attempts to decode the RAR message (FIG. 5 MSG2)

MSG2 may include: Time Backoff, RAPID, Timing Advance, UL Grant, TC-RNTI (note that different backoff values may be used (×160 ms) for different rapid to spread the processing load at the GNB)

UL Grant for MSG3

Frequency Hopping Flag (1 bit) [set to 0 if transform pre-coding is used]

Frequency Resource Allocation [Type 1: Start RB and allocated RBs (14 bits)]

Time Resource Allocation [Index to a LUT] (4 bits) Default table A LUT entries:

| Row Index | Slot offset (K2) | Start symbol | Length (symbol) |
|---|---|---|---|
| 1 | 1 | 0 | 14 |
| 8 | 2 | 0 | 14 |
| 11 | 3 | 0 | 14 |
| 15 | 4 | 0 | 14 |

MCS index (4 bits) [use one of first 16 entries of "64QAM with Transform Pre-coding" MCS table.

Transmit Power Control Command (3 bits):

| TPC | Value (dB) |
|---|---|
| 0 | −6 |
| 1 | −4 |
| 2 | −2 |
| 3 | 0 |
| 4 | 2 |
| 5 | 4 |
| 6 | 6 |

CSI Report (1 bit) [aperiodic CSI report when using contention free RA procedures]

3. PUSCH—Scheduled Transmission (MSG3)—UE Transmits an RRCSetupRequest or RRCResumeRequest Etc.

UE calculates to TX power

UE transmits MSG3 on the PUSCH using the allocated resources

Length of the MSG3 is 7 or 9 bytes

UE MAC starts its contention resolution timer (set to 64 ms)

UE RRC starts the following timers

T300: for RRCSetupRequest

T301: for RRCReestablishmentRequest

T319: for RRCResumeRequest

UE monitors the PDCCH for a DCI using Format 0_0 and with CRC bits scrambled by the TC-RNTI. If detected:

UE retransmits MSG3

Contention resolution timer is reset (MAC only)

4. Contention Resolution (MSG4)

UE monitors the PDCCH, awaiting a DCI using Format 1_0 and CRC bits scrambled by the TC-RNTI. If detected:

UE attempts to decode MSG4: the contention resolution MAC control element (CE) includes the first 48 bits of the gNB decoded uplink CCCH SDU if the bits do not match, then that the RACH process restarts with a new preamble if the bits match, then there is no contention and the UE reports this using an acknowledgement. Furthermore, TC-RNTI becomes the C-RNTI.

Note that in FIG. 5 the acknowledgement for MSG4 is either sent (when the acknowledgment marker in the system information broadcast by the gNB is not set) via the PUCCH as a HARQ ACK or is sent (when the acknowledgment marker in the system information broadcast by the gNB is set) via the UL resource granted for MSG3.

Figures 6A, 6B, 6C, 6D:
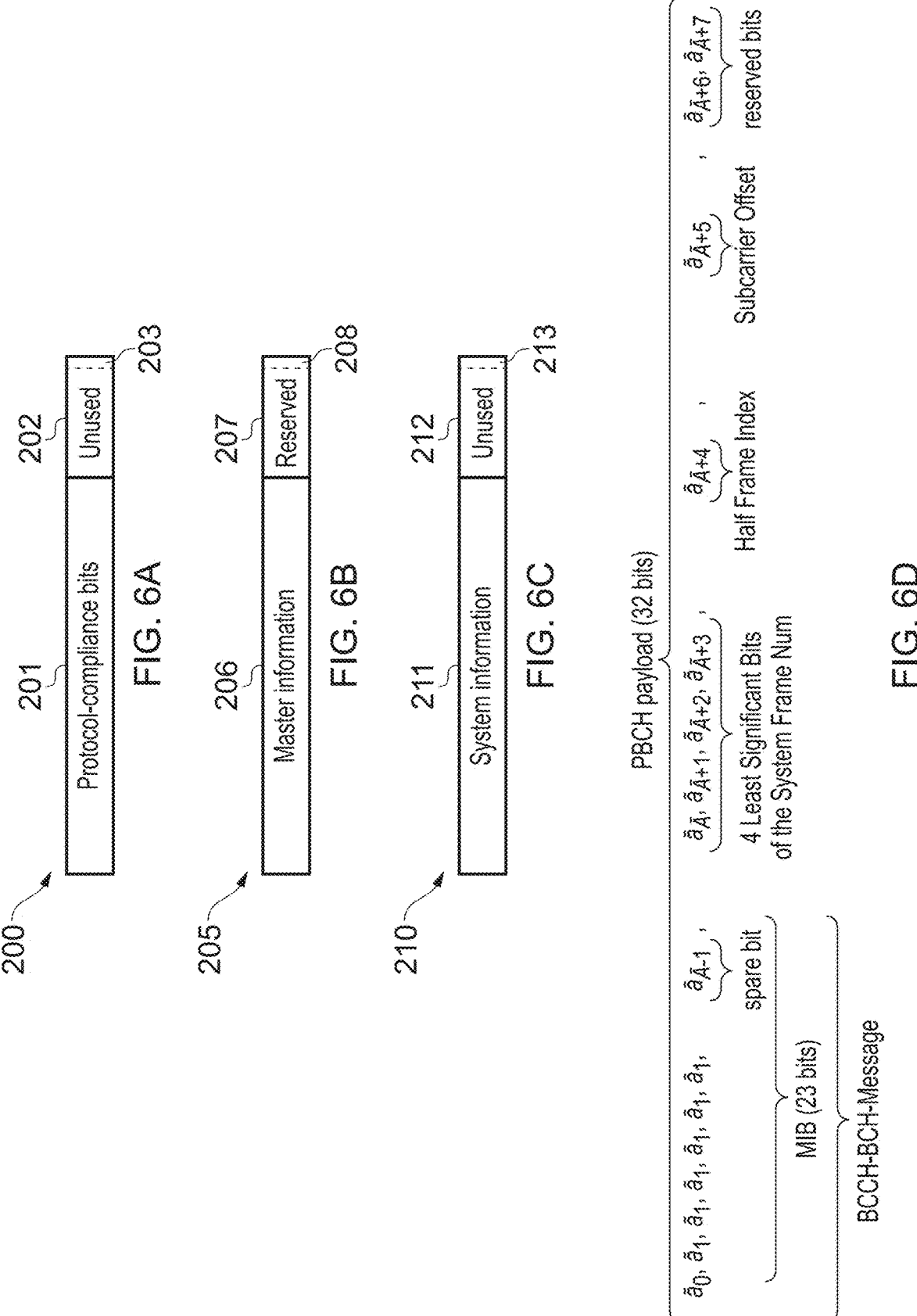

FIGS. 6A-D schematically illustrate various examples of system information broadcast on a physical broadcast channel by a base station and one or more bits in that system information which is used as an acknowledgement control marker in accordance with some disclosed examples. FIG. 6A schematically illustrates a block of bits 200 in the system information, comprising a protocol-compliance set of bits 201 and a protocol-unused set of bits 202, where one or more of the protocol-unused set of bits is used for the acknowledgement control marker 203. FIG. 6B schematically illustrates a master information block 205, comprising portion of bits 206 used to convey the master information and a reserved set of bits 207, where one or more of the reserved set of bits 207 is used for the acknowledgement control marker 208. FIG. 6C schematically illustrates a system information block 210, comprising portion of bits 211 used to convey the system information and an unused set of bits 212, where one or more of the reserved set of bits 212 is used for the acknowledgement control marker 213. FIG. 6D shows a 32-bit PBCH payload, wherein either the spare bit within the 23-bit MIB or one of the bits shown as reserved bits is used for the acknowledgement control marker. In other examples the acknowledgement control marker is provided by means of the lateNonCriticalExtension Information Element in the SIB1. For such examples another protocol-unused set of bits can be used for the acknowledgement control marker and the lateNonCriticalExtension Information Element in the SIB1 is just one example set of bits reserved for proprietary vendor-specific communication messages between the user device and the base station, which may be adapted for this purpose.

In brief overall summary, in a wireless communications system comprising a user device and a base station, the base station periodically broadcasts system information which is used by the user device in a random access procedure to connect to the base station. The base station grants uplink resource to the user device for sending a connection request message. In response to the connection request message, the base station transmits a contention resolution message, which the user device must acknowledge. The system information periodically broadcast by the base station comprises an acknowledgement control marker defining whether the acknowledgement is to be sent on a reserved uplink control channel using second uplink resource or via first uplink resource allocated to the user device in the uplink grant for the connection request message.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A wireless communications system comprising a user device and a base station, wherein the base station is configured to periodically broadcast system information on a physical broadcast channel, wherein the user device is configured, when in an unconnected state with respect to the base station, to participate in a random access procedure to seek to establish a connected state with respect to the base station, wherein the random access procedure comprises:

the user device transmitting a random access preamble in accordance with parameters specified in the system information;

in response to the random access preamble, the base station transmitting a random access response, wherein the random access response indicates an uplink grant allocated to the user device, the uplink grant comprising a first uplink resource allocated to the user device for a connection request message;

in response to the random access response, the user device transmitting the connection request message via the first uplink resource;

in response to the connection request message, the base station transmitting a contention resolution message; and in response to the contention resolution message, the user device transmitting an acknowledgement signal, wherein the system information periodically broadcast by the base station on the physical broadcast channel comprises an acknowledgement control marker, and wherein the user device is configured:

when the acknowledgement control marker is not set, to transmit the acknowledgement signal on a reserved uplink control channel using a second uplink resource, and when the acknowledgement control marker is set, to transmit the acknowledgement signal via the first uplink resource (i) allocated to the user device in the uplink grant and (ii) used for transmitting the connection request message in response to the random access response.

2. The wireless communications system as claimed in claim 1, wherein the base station is configured to statically reserve the second uplink resource for the reserved uplink control channel when broadcasting the system information comprising the acknowledgement control marker which is not set.

3. The wireless communications system as claimed in claim 2, wherein the base station is configured not to statically reserve the second uplink resource for the reserved uplink control channel when broadcasting the system information comprising the acknowledgement control marker which is set.

4. The wireless communications system as claimed in claim 3, wherein the base station is configured to allocate the second uplink resource for user device upload on a demand basis.

5. The wireless communications system as claimed in claim 1, wherein the system information broadcast on the physical broadcast channel comprises a master information block and at least one system information block.

6. The wireless communications system as claimed in claim 5, wherein the user device and the base station are configured to communicate in accordance with a standardized protocol, wherein the standardized protocol defines the master information block to comprise a predetermined set of bits, wherein the predetermined set of bits comprises a protocol-compliance set of bits and a protocol-unused set of bits, wherein at least one of the protocol-unused set of bits is used for the acknowledgement control marker.

7. The wireless communications system as claimed in claim 6, wherein the at least one of the protocol-unused set of bits used for the acknowledgement control marker is at least one spare bit forming part of the master information block.

8. The wireless communications system as claimed in claim 6, wherein the standardized protocol defines the system information to be broadcast on the physical broadcast channel in a predetermined payload size comprising the predetermined set of bits of the master information block and a further portion, wherein at least one of the protocol-unused set of bits used for the acknowledgement control marker is at least one bit of the further portion.

9. The wireless communications system as claimed in claim 8, wherein the at least one of the protocol-unused set of bits used for the acknowledgement control marker is at least one reserved bit forming part of a physical broadcast channel payload.

10. The wireless communications system as claimed in claim 5, wherein the user device and the base station are configured to communicate in accordance with a standardized protocol, wherein the standardized protocol defines the at least one system information block to comprise at least one protocol-unused set of bits, wherein the at least one protocol-unused set of bits is used for the acknowledgement control marker.

11. The wireless communications system as claimed in claim 10, wherein the at least one protocol-unused set of bits used for the acknowledgement control marker comprises a set of bits reserved for proprietary vendor-specific communication messages between the user device and the base station.

12. The wireless communications system as claimed in claim 10, wherein the at least one protocol-unused set of bits used for the acknowledgement control marker comprises a lateNonCriticalExtension octet string of an LTE protocol.

13. A method of operating a wireless communications system comprising a user device and a base station, the method comprising:

the base station periodically broadcasting system information on a physical broadcast channel; and the user device, when in an unconnected state with respect to the base station, participating in a random access procedure to seek to establish a connected state with respect to the base station, wherein the random access procedure comprises:

the user device transmitting a random access preamble in accordance with parameters specified in the system information;

in response to the random access preamble, the base station transmitting a random access response, wherein the random access response indicates an uplink grant allocated to the user device, the uplink grant comprising a first uplink resource allocated to the user device for a connection request message;

in response to the random access response, the user device transmitting the connection request message via the first uplink resource;

in response to the connection request message, the base station transmitting a contention resolution message; and in response to the contention resolution message, the user device transmitting an acknowledgement signal, wherein the system information periodically broadcast by the base station on the physical broadcast channel comprises an acknowledgement control marker, and wherein the user device:

when the acknowledgement control marker is not set, transmits the acknowledgement signal on a reserved uplink control channel using a second uplink resource, and when the acknowledgement control marker is set, transmits the acknowledgement signal via the first uplink resource (i) allocated to the user device in the uplink grant and (ii) used for transmitting the connection request message in response to the random access response.

14. A base station for communicating with a user device in a wireless communications system, wherein the base station comprises one or more processors configured to:

periodically broadcast system information on a physical broadcast channel, and;

when in an unconnected state with respect to the user device, participate in a random access procedure to seek to establish a connected state with respect to the user device, wherein in the random access procedure, the one or more processors are configured to:

listen for and receive a random access preamble transmitted by the user device in accordance with parameters specified in the system information;

transmit a random access response in response to the random access preamble, wherein the random access response indicates an uplink grant allocated to the user device, the uplink grant comprising a first uplink resource allocated to the user device for a connection request message;

listen for and receive the connection request message transmitted by the user device via the first uplink resource;

transmit a contention resolution message in response to the connection request message; and listen for and receive an acknowledgement signal transmitted by the user device in response to the contention resolution message, wherein the system information periodically broadcast by the one or more processors on the physical broadcast channel comprises an acknowledgement control marker, and wherein the one or more processors are configured:

when the acknowledgement control marker is not set, to listen for and receive the acknowledgement signal on a reserved uplink control channel using a second uplink resource, and when the acknowledgement control marker is set, to listen for and receive the acknowledgement signal via the first uplink resource (i) allocated to the user device in the uplink grant and (ii) used for receiving the connection request message in response to the random access response.

15. A method of operating a base station configured to communicate with a user device in a wireless communications system, the method comprising:

periodically broadcasting system information on a physical broadcast channel; and when in an unconnected state with respect to the user device, participating in a random access procedure to seek to establish a connected state with respect to the user device, wherein the random access procedure comprises:

listening for and receiving a random access preamble transmitted by the user device in accordance with parameters specified in the system information;

transmitting a random access response in response to the random access preamble, wherein the random access response indicates an uplink grant allocated to the user device, the uplink grant comprising a first uplink resource allocated to the user device for a connection request message;

listening for and receiving the connection request message transmitted by the user device via the first uplink resource;

transmitting a contention resolution message in response to the connection request message; and listening for and receiving an acknowledgement signal transmitted by the user device in response to the contention resolution message, wherein the system information periodically broadcast by the base station on the physical broadcast channel comprises an acknowledgement control marker, and wherein the base station:

when the acknowledgement control marker is not set, listens for and receives the acknowledgement signal on a reserved uplink control channel using a second uplink resource, and when the acknowledgement control marker is set, listens for and receives the acknowledgement signal via the first uplink resource (i) allocated to the user device in the uplink grant and (ii) used for receiving the connection request message in response to the random access response.

16. A user device for communicating with a base station in a wireless communications system, wherein the user device comprises one or more processors configured, when in an unconnected state with respect to the base station, to participate in a random access procedure to seek to establish a connected state with respect to the base station, wherein the one or more processors are configured to listen for and receive system information periodically broadcast on a physical broadcast channel by the base station, wherein, in the random access procedure, the one or more processors are configured to:

transmit a random access preamble in accordance with parameters specified in the system information;

listen for and receive a random access response transmitted by the base station in response to the random access preamble, wherein the random access response indicates an uplink grant allocated to the user device, the uplink grant comprising a first uplink resource allocated to the user device for a connection request message;

transmit the connection request message via the first uplink resource;

listen for and receive a contention resolution message transmitted by the base station in response to the connection request message; and transmit an acknowledgement signal in response to the contention resolution message, wherein the system information periodically broadcast by the base station on the physical broadcast channel comprises an acknowledgement control marker, and wherein the one or more processors are configured:

when the acknowledgement control marker is not set, to transmit the acknowledgement signal on a reserved uplink control channel using a second uplink resource, and when the acknowledgement control marker is set, to transmit the acknowledgement signal via the first uplink resource (i) allocated to the user device in the uplink grant and (ii) used for transmitting the connection request message in response to the random access response.

17. A method of operating a user device configured to communicate with a base station in a wireless communications system, the method comprising:

listening for and receiving system information periodically broadcast on a physical broadcast channel by the base station; and when in an unconnected state with respect to the base station, participating in a random access procedure to seek to establish a connected state with respect to the base station, wherein the random access procedure comprises:

transmitting a random access preamble in accordance with parameters specified in the system information;

listening for and receiving a random access response transmitted by the base station in response to the random access preamble, wherein the random access response indicates an uplink grant allocated to the user device, the uplink grant comprising a first uplink resource allocated to the user device for a connection request message;

transmitting the connection request message via the first uplink resource;

listening for and receiving a contention resolution message transmitted by the base station in response to the connection request message; and transmitting an acknowledgement signal in response to the contention resolution message, wherein the system information periodically broadcast by the base station on the physical broadcast channel comprises an acknowledgement control marker, and wherein the user device:

when the acknowledgement control marker is not set, transmits the acknowledgement signal on a reserved uplink control channel using a second uplink resource, and when the acknowledgement control marker is set, transmits the acknowledgement signal via the first uplink resource (i) allocated to the user device in the uplink grant and (ii) used for transmitting the connection request message in response to the random access response.

* * * * *